Aug. 28, 1923.

J. L. SANDS 1,466,148

CRANK

Filed July 12, 1922

Jesse L. Sands
INVENTOR

BY Victor J. Evans
ATTORNEY

WITNESS:

Patented Aug. 28, 1923.

1,466,148

UNITED STATES PATENT OFFICE.

JESSE L. SANDS, OF FAIRMONT, WEST VIRGINIA.

CRANK.

Application filed July 12, 1922. Serial No. 574,359.

*To all whom it may concern:*

Be it known that I, JESSE L. SANDS, a citizen of the United States, residing at Fairmont, in the county of Marion and State of West Virginia, have invented new and useful Improvements in Cranks, of which the following is a specification.

My present invention has reference to a crank for winding phonograph springs.

My object is to produce a winding means for this and other class of springs so constructed as to permit of the handle portion yielding on the stem or shaft portion when the spring has become fully wound to avoid the liability of breaking of the spring.

The foregoing and other objects which will present themselves as the nature of the invention is better understood, may be accomplished by construction, combination and operative association of parts such as is disclosed by the drawing which accompanies and which forms part of this application.

In the drawing:—

Figure 1:
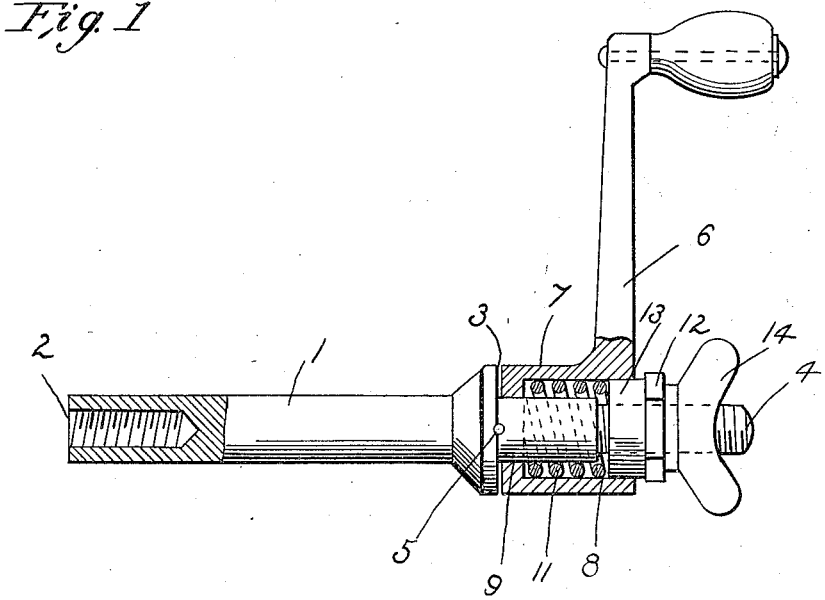
Figure 1 is a side elevation of the improvement with parts broken away and parts in section.
Figure 3:
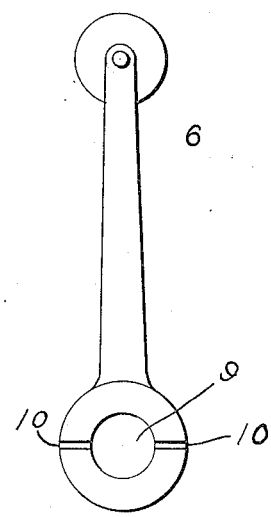
Figure 3 is a plan view of the handle, looking toward the inner end thereof.
Figure 2:
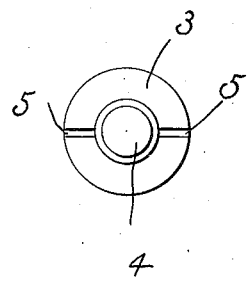
Figure 2 is a plan view of the shaft looking toward the outer end thereof.

Referring now to the drawing in detail the shaft portion of the improvement is indicated by the numeral 1, the same having its outer end provided with the usual threaded opening 2 that is screwed on the winding shaft of a spring motor such as is commonly employed in connection with phonographs or similar talking machines. The shaft 2 has its outer end threaded and is formed at a suitable distance inward of the threads with an annular enlargement whose outer face is flat, and which provides a shoulder 3. The shoulder, at aligning points to the opposite sides of the threaded extension 4 of the shaft is formed with V-shaped ribs 5.

The crank is indicated by the numeral 6, the same having one of its ends provided with an offset handle portion and its opposite end with a socket portion 7. The bore 8 of the socket is enlarged from the outer end thereof as indicated by the numeral 8, the rear wall of the socket being provided with a rather restricted round opening 9 through which the threaded end 4 of the shaft passes. The outer flat face of the socket has aligning V-shaped grooves 10 that are designed to receive the ribs 5 on the shoulder 3 of the shaft. In the bore of the socket and, of course, surrounding the threaded extension of the shaft there is a helical spring 11. Screwed on the shaft there is a nut 12. The nut has a round extension 13 that is received in the socket 8, and that contacts with the spring 11. Also screwed on the threaded end of the shaft and contacting with the nut 12 there is a winged nut 14. This winged nut is in the nature of a locking element.

It will be apparent, from the foregoing description, when taken in connection with the drawing that when the shaft 1 is screwed upon the winding shaft of a spring motor, both shafts will be turned in unison by the crank handle 6. When the winding spring of the winding shaft has become fully wound the pressure exerted by the spring 11 between the socket of the crank handle and the shoulder of the shaft 1 will yield sufficiently to permit of the grooves 10 being brought out of engagement with the ribs 5 on the shoulder 3 of the shaft, thus permitting a limited free turning of the crank handle on the shaft 1, sufficient to warn the operator that the said motor shaft has been fully wound and thus preventing the breakage of the motor spring by overwinding.

Having described the invention, I claim:—

In a device for the purpose set forth, a shaft for engaging the winding means of a spring motor, said shaft having an outer threaded end and a shoulder inward of said end, said shoulder having ribs thereon, a crank handle having a socket which is received on the threaded end of the shaft, said socket having grooves to receive the ribs on the shoulder, a spring in the socket, a nut screwed on the threaded end of the shaft and contacting the spring for influencing the socket to bring the grooves thereof to receive the ribs on the shoulder of the shafts, and a locking nut also screwed on the said threaded end of the shaft.

In testimony whereof I affix my signature.

JESSE L. SANDS.